United States Patent [19]

Modolo

[11] Patent Number: 4,771,649
[45] Date of Patent: Sep. 20, 1988

[54] DRIVING MEANS OF A BICYCLE BRAKE, IN PARTICULAR A RACING BICYCLE

[75] Inventor: Domenico Modolo, Conegliano, Italy

[73] Assignee: Modolo Adamo & C. S.N.C., Sarano di S. Lucia di Piave, Italy

[21] Appl. No.: 85,102

[22] PCT Filed: Nov. 8, 1986

[86] PCT No.: PCT/EP86/00644

§ 371 Date: Sep. 11, 1987

§ 102(e) Date: Sep. 11, 1987

[87] PCT Pub. No.: WO87/02957

PCT Pub. Date: May 21, 1987

[30] Foreign Application Priority Data

Nov. 19, 1985 [IT] Italy ................. 22903 A/85

[51] Int. Cl.$^4$ .................. B60T 11/16; B62L 3/02; B62K 23/06
[52] U.S. Cl. ...................... 74/489; 74/488; 74/502.2; 188/344
[58] Field of Search .............. 74/488, 489, 501 B; 188/344

[56] References Cited

U.S. PATENT DOCUMENTS

| 2,271,273 | 1/1942 | Mueller | 188/344 |
| 3,760,648 | 9/1973 | Hoffman | 74/489 |
| 3,835,724 | 9/1974 | Hoffman | 74/489 |
| 3,899,056 | 8/1975 | Doerr | 188/344 |
| 3,935,930 | 2/1976 | Kine | 188/344 |
| 4,665,803 | 5/1987 | Mathauser | 188/344 |

FOREIGN PATENT DOCUMENTS

| 168848 | 4/1903 | Fed. Rep. of Germany | 74/489 |
| 3651 | 2/1904 | United Kingdom | 188/344 |
| 800196 | 8/1958 | United Kingdom . | |

Primary Examiner—Allan D. Herrmann
Attorney, Agent, or Firm—Young & Thompson

[57] ABSTRACT

A bicycle brake actuating device includes a brake lever (21) hinged in such a way to turn around an axis (X) substantially parallel to the supporting axis (Y) of a cyclist's hand. The brake lever can be supported by two tabs (17) placed on the hand's supporting handle (14). A holding cavity (40) is preferably utilized to receive the transmission of the brake lever and the mechanism (30, 32) that is part of the actuating device.

4 Claims, 3 Drawing Sheets

DRIVING MEANS OF A BICYCLE BRAKE, IN PARTICULAR A RACING BICYCLE

This invention refers to a driving means for a bicycle brake, in particular a racing bicycle.

The known devices have the disadvantage of obliging the cyclist to carry out with each finger a different stroke; often the little finger, weaker than the other fingers, has to perform the major effort. Moreover the free end of the lever is one of the main causes which provoke physical damage during falls. Beside that, the levers that are actually found on the market are scarcely aerodynamic. Their driving mechanisms are often irrational, providing, for instance, narrow curves for the control wire, especially when the passage of cables is provided inside the handle bar tube.

Furthermore, in the speed contests, bicycles having a reversed handle bar in comparison to the ordinary racing one are used. This handle bar is indeed turned over, extending itself in a straight line position that facilitates the hand hold and permits the cyclist to assume a more aerodynamic position. In these cases the problem of actuating the braking lever is even more serious. The solutions so far effected are not very efficient; the actuating rod has to traverse exessively narrow curves and this facilitates breakages and makes eventual substitutions long and difficult.

Purpose of this invention is to provide a brake actuating device more confortable for the cyclist, more trustworthy and secure, permitting even simple substitutions of pieces as well as a construction that is on the whole aerodynamic.

Another purpose is that of creating a device that can be adapted to handle bars having upturned ends, handle bars that are used in speed contests.

The proposed driving means achieve the above mentioned aims providing a lever hinged in such way as to rotate around an axis substantially parallel to the hand's supporting axis.

A preferred solution provides that the brake's lever is U shaped and that its ends are hinged on the grip of the handle bar.

Another favorable solution is that of providing for a cavity in the grip to contain the brake driving mechanism.

In this last case it is preferable to let the grip protrude a certain distance over the tube forming the structure of the handle bar, so to obtain at its ends a wide cavity.

Another favourable solution is that of realizing the axis lever support with two tabs parallel to the grip of the handle bar.

The driving mechanism can be both hydraulic and mechanic, providing the passing from one solution to the other by simple substitution of some mechanical piece.

Particularly, the driving mechanism can consist in a pivot joint and a rockerarm that set in action a small hydraulic piston or alternatively the tie rod of a flexible wire control.

The invention will be now better explained with reference to an examplary embodiment that is shown in the enclosed drawings, in wich:

Figure 1:
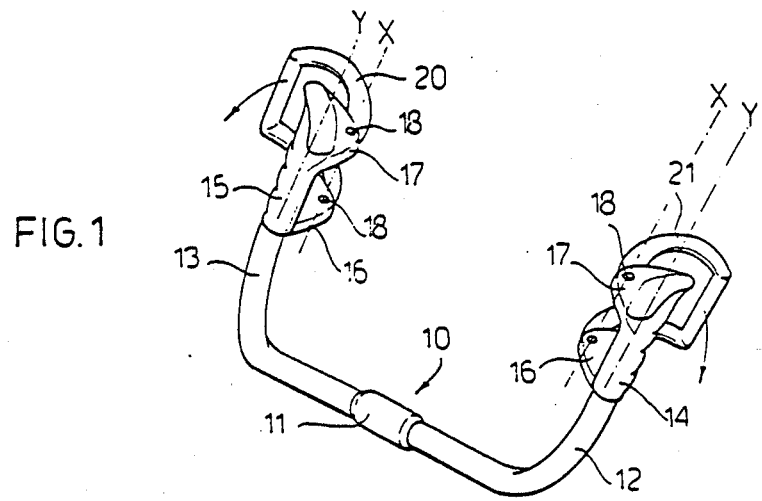
FIG. 1 is a perspective view of the whole handle bar on which the proposed device is set.
Figure 4:
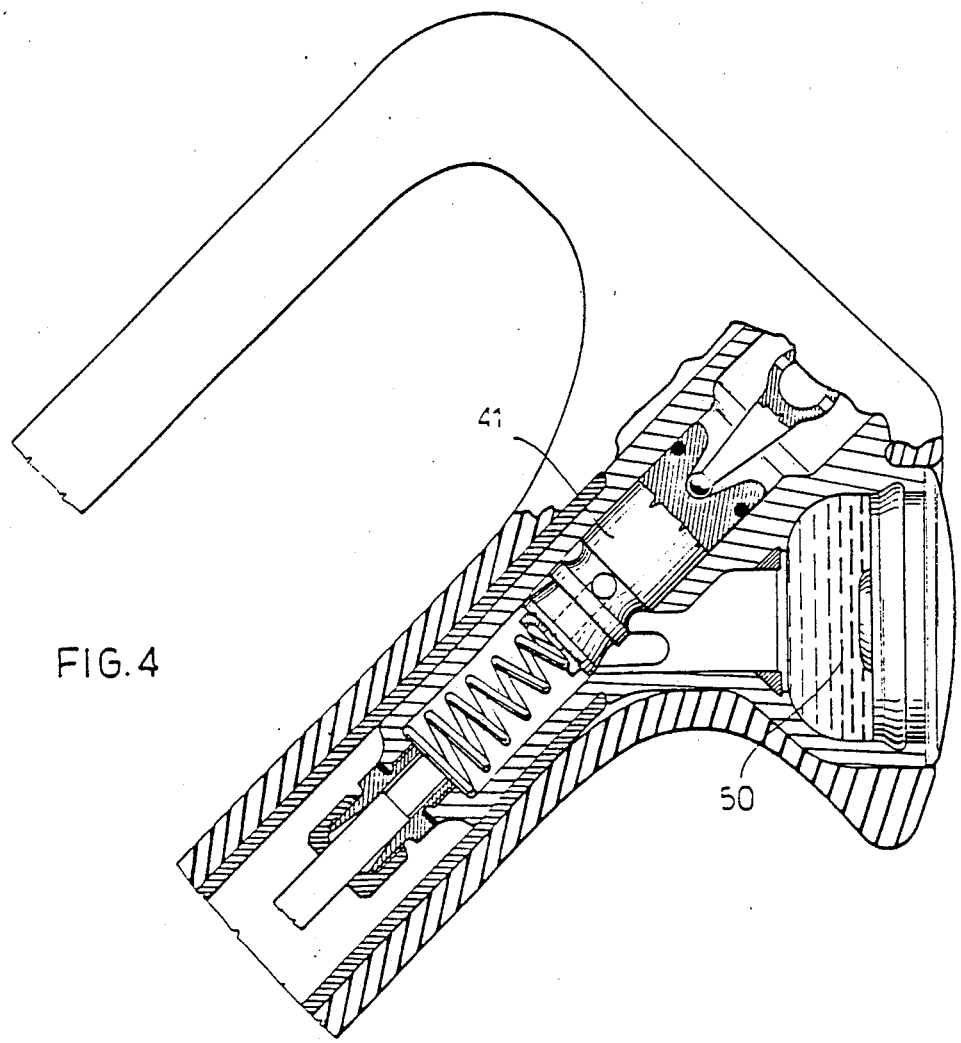
FIG. 4 is the view of section 4—4 in FIG. 2.
Figure 2:
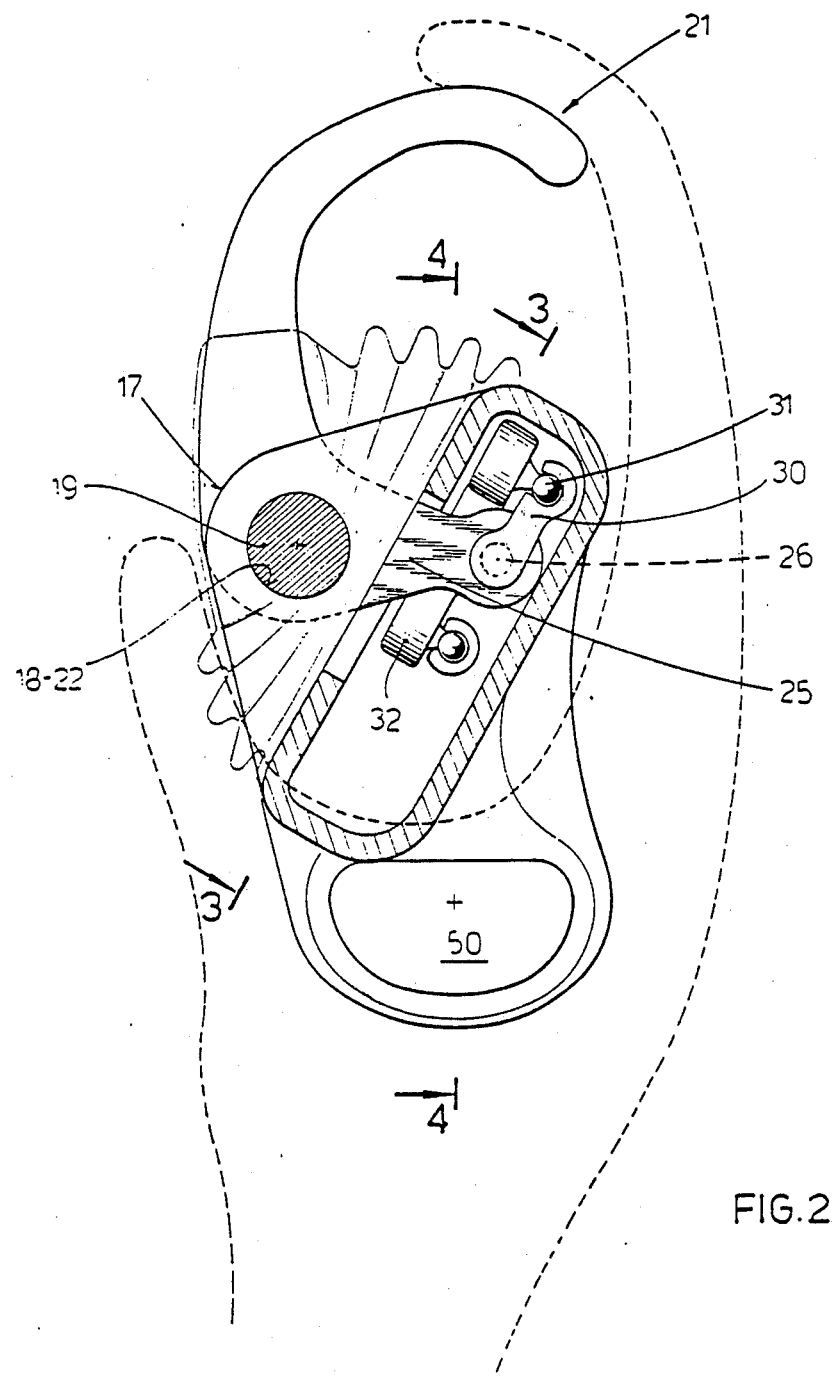
FIG. 2 is a partially sectioned upper view of a handle including the proposed device, also indicating the position of the cyclist's hand.
Figure 3:
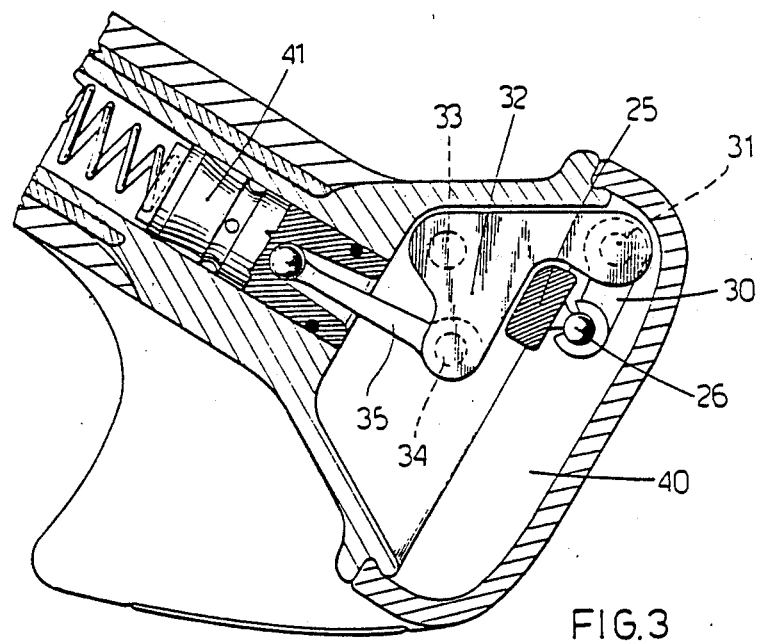
FIG. 3 is the view of section 3—3 in FIG. 2.

From the drawings it can be seem that the handle bar 10 has a middle portion 11 adapted to be inserted in the bicycle's stem and two braces 12 and 13 that extend towards the front and upper side. At the ends of these braces are foreseen hand grips 14 and 15 including each one a wide cavity 40 and two lateral tabs 16 and 17. Each of these provide a seat 18 in which is inserted a bolt 19 that allows the rotation of levers 20 and 21 around an axis X parallel to the axis Y of handle 14 or 15. These levers are shaped as a U and have their ends provided with a seat 22 for bolt 19 and with a lug 25. This lug 25 is provided with a spherical head 26 on which is engaged an end of the pivot joint 30 whose other end is engaged in another spherical head 31 fast with an arm of an L-shaped rockerarm 32.

The rockerarm 32 is hinged at a fixed point 33 inside the handle in cavity 40. As visible from the drawings all the mechanisms are contained in the mentioned cavity. In particular the rockerarm 32 has another arm that is adapted to press with its end 34 on bar 35 that drives a small hydraulic cylinder 41 to set in action the brake shoes (not represented) holding the braking pads. The hydraulic cylinder 41 is progressively fed by reservoir 50 provided at the highest part of the handle, on an enlarged portion thereof.

Figure 5:
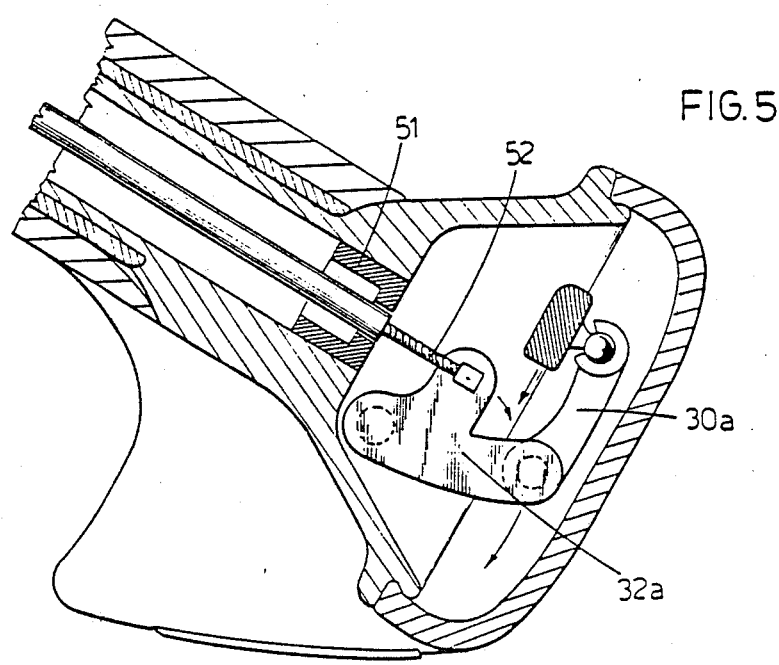
FIG. 5 is the schematic view of a variant of the actuating mechanism.

It is also possible to foresee a wire-driven mechanism of the kind shown in FIG. 5. In this case the lug 25 will receive the end of a pivot joint 30a similar to pivot 30 and this will be connected to a rockerarm 32a that will set in action, in a similar way, instead of cylinder 41, the wire 52 of a flexible wire drive 51.

I claim:

1. In combination with a bicycle handlebar having a hand grip, a brake actuating lever pivotally mounted on the handlebar, the lever being U-shaped and having legs that straddle the hand grip and that are mounted for pivotal movement on and relative to the handlebar about an axis parallel to that of the hand grip.

2. Structure as claimed in claim 1, the hand grip having two lugs to which said legs of the brake lever are respectively pivotally interconnected.

3. Structure as claimed in claim 2, said handlebar having two hand grips on opposite ends thereof, said lugs of each hand grip extending toward the other hand grip, and said legs of each U-shaped brake lever extending forwardly from said lugs and curving outwardly and terminating in an upright cross piece that interconnects the legs of each brake lever.

4. Structure as claimed in claim 1, the handlebar being hollow, and brake actuating mechanism connected to the lever within the handlebar.

* * * * *